United States Patent [19]

Ratcliffe et al.

[11] 4,127,376
[45] Nov. 28, 1978

[54] METHOD AND APPARATUS FOR FORMING A FIBROUS AND LAYERED STRUCTURE

[75] Inventors: John F. Ratcliffe, Marlow; Jeffrey G. Barker, High Wycombe, both of England

[73] Assignee: Ranks Hovis McDougall Limited, London, England

[21] Appl. No.: 720,099

[22] Filed: Sep. 2, 1976

[30] Foreign Application Priority Data

May 25, 1976 [GB] United Kingdom ............... 21620/76

[51] Int. Cl.² ............................. A23P 1/00; B29F 3/02
[52] U.S. Cl. .................................. 425/380; 425/382 R; 425/461; 425/464
[58] Field of Search ............... 425/378 R, 380, 382 R, 425/463, 464, 462, 461; 426/516, 517, 506

[56] References Cited

U.S. PATENT DOCUMENTS

| | | | |
|---|---|---|---|
| 3,847,531 | 11/1974 | McComb | 425/464 |
| 3,870,805 | 3/1975 | Hayes et al. | 426/506 |
| 3,881,984 | 5/1975 | Soda et al. | 425/463 X |
| 3,928,641 | 12/1975 | Hoer | 425/461 X |
| 3,973,890 | 10/1976 | Porter | 425/466 X |

Primary Examiner—Francis S. Husar
Assistant Examiner—William R. Briggs
Attorney, Agent, or Firm—McCormick, Paulding & Huber

[57] ABSTRACT

A method and apparatus for forming a proteinaceous mass into a fibrous and layered structure, including imparting a gross fibrous structure to the mass by passing the mass through a helical conveyor and layering the fibrous structure by extruding the same through a slot and changing the direction of movement of the mass as it emerges from the slot into an opening, the compression and extrusion being carried out at elevated temperature to heat set the mass.

6 Claims, 21 Drawing Figures

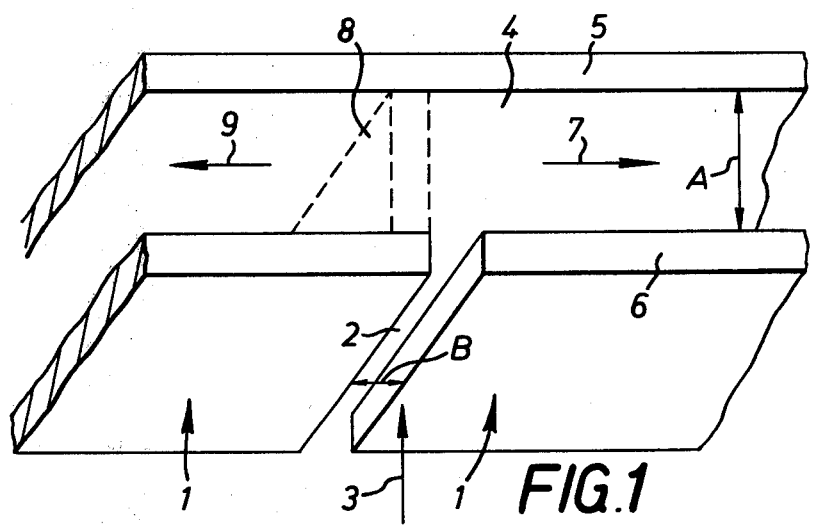
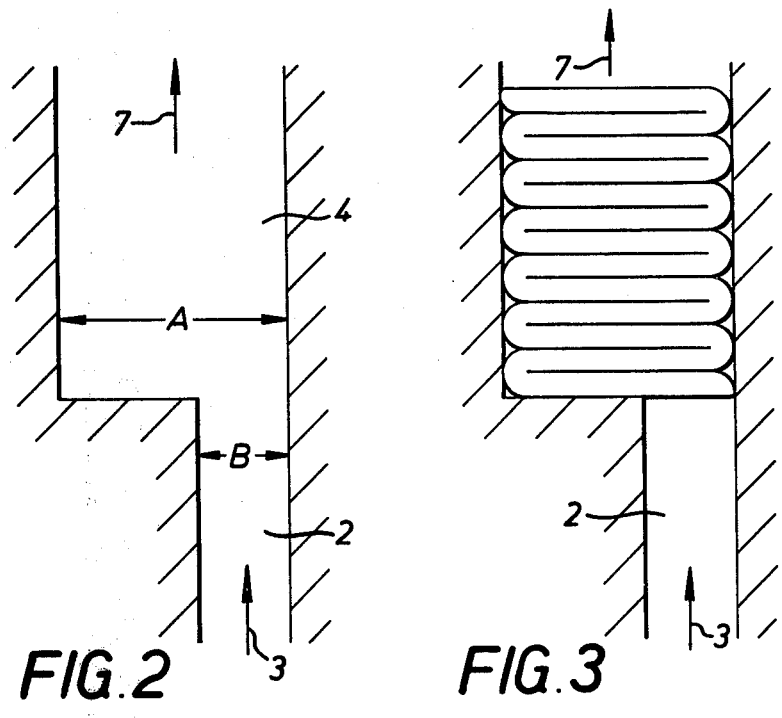

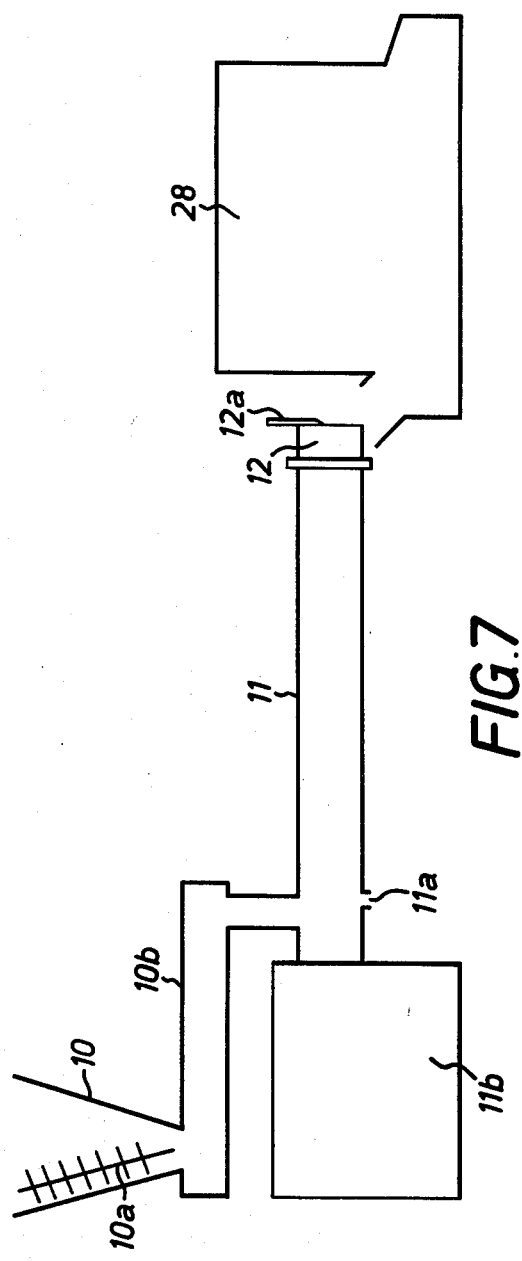

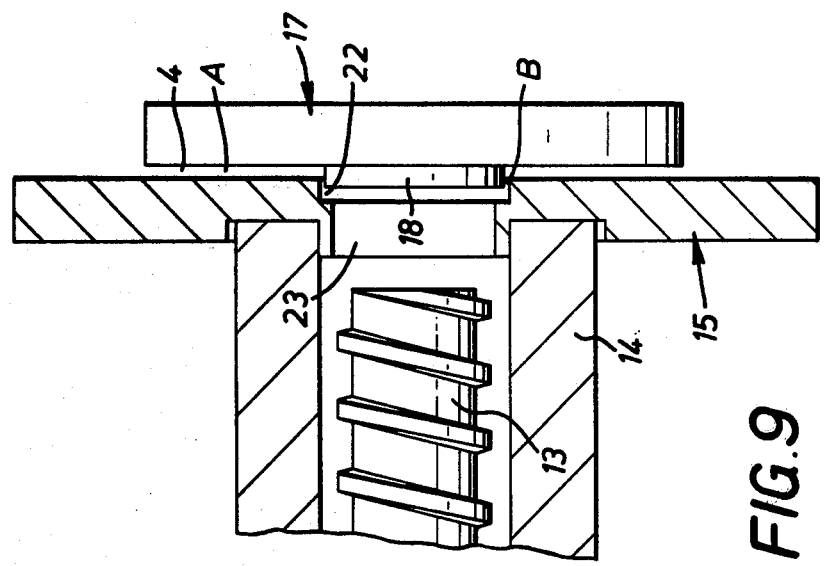
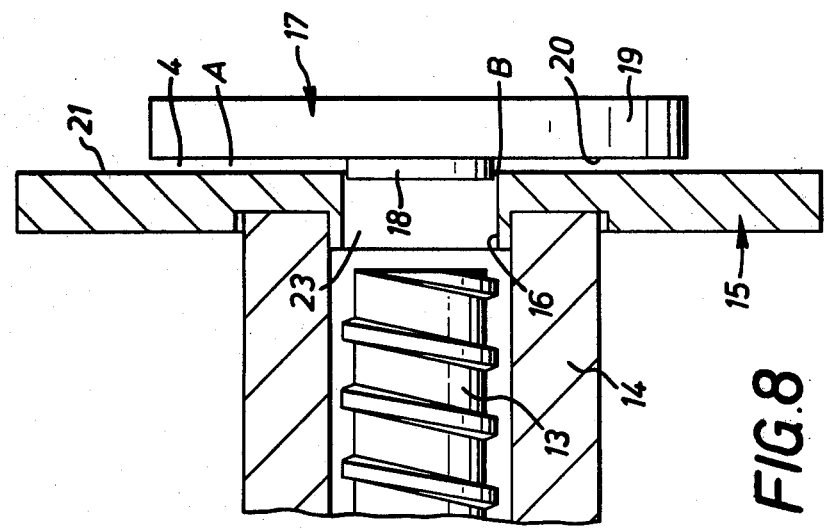

METHOD AND APPARATUS FOR FORMING A FIBROUS AND LAYERED STRUCTURE

This invention relates to a method and apparatus for forming a proteinaceous mass into a fibrous and layered structure and also to a proteinaceous material for use as a foodstuff.

Many proposals have been made for forming a proteinaceous mass into a structure which resembles known foodstuffs, for example, meat and fish and essentially these prior proposals seek to achieve a layered and fibrous structure. Natural meat and fish are layered and one of the characteristics of these foodstuffs is that they will readily break apart at the boundaries of the layers. Also, particularly with meat, a close examination reveals a gross fibrous structure. In order to simulate the appearance of meat in a proteinaceous mass which does not inherently possess a gross fibrous structure, for example soya, it has previously been proposed to pass the amorphous mass through a device which includes an internally rotating helical conveyor, for example, a Wenger extruder and then to extrude the mass axially in the form of a rope which may then be further processed. The rotating helical conveyor imparts a certain amount of gross fibrous texture to the amorphous mass.

It is the main object of this invention to provide a method and apparatus for forming a proteinaceous mass into a fibrous and layered structure which may be utilised for the production of foodstuffs which gives a much more realistic similarity to the natural foodstuffs than hitherto proposed processes.

According to the present invention there is provided a method of forming a proteinaceous mass into a fibrous and layered structure which includes moving the mass in a helical path simultaneously compressing the mass to impart to the mass a gross fibrous structure, extruding the compressed mass through an elongate slot and changing the direction of movement of the mass as it emerges from the slot into an opening to layer the mass, the compression and extrusion being carried out at elevated temperature to heat set the mass.

The invention also includes apparatus for forming a proteinaceous mass into a fibrous and layered structure, including a helical conveyor operable within a housing and a die at or towards the downstream end of the helical conveyor, said die including a slot through which the extrudate emerges into an opening disposed in a plane through the rectilinear axis of the helical conveyor or parallel with a plane within which lies the rectilinear axis of the helical conveyor and heating means for raising the temperature of the mass.

Still further, the invention includes an edible proteinaceous material comprising a flat extrudate, the length of the extrudate being built up in layers and the extrudate having a gross fibrous structure, the gross fibres lying in a general direction parallel with the boundaries between layers and parallel with the major faces of the extrudate.

In order to illustrate the invention, several embodiments thereof will now be described, by way of example only, and with reference to the accompanying drawings, in which:

FIG. 1 is a diagrammatic representation of a part of apparatus in accordance with the invention showing an underlying principle of operation;

FIG. 2 is a diagrammatic representation of part of further apparatus in accordance with the invention illustrating a further basic concept thereof;

FIG. 3 is a diagrammatic illustration showing the manner in which the material becomes layered within the apparatus of FIG. 2;

FIG. 7 is a diagrammatic view showing a basic layout of apparatus in accordance with the invention;

FIG. 8 is a cross-sectional view through a die constructed in accordance with one embodiment of the invention;

FIG. 9 is a cross-sectional view through a die in accordance with a further embodiment of the invention;

Figure 4:
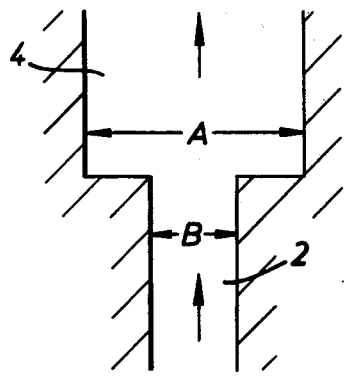
FIG. 4 is a diagrammatic representation of a part of further apparatus in accordance with the invention.

One of the basic concepts of the method of the present invention may be explained with reference to FIG. 1 of the drawings in which a die 1 is provided which defines an elongate slot 2 through which the mass is forced in the direction of arrow 3. The precise shape and size of the elongate slot 2 may vary considerably dependent upon the nature of the product to be produced, and the starting materials.

The slot 2 leads to an opening 4 defined by side walls 5 and 6, the side wall 5 being opposite the outlet of slot 2, and against this wall 5 the extrudate impinges as it emerges from the slot 2. This wall 5 may be as depicted in FIG. 1, namely at right angles to the direction of movement of the mass as it emerges from slot 2, or may be at some other suitable angle. The mass in being forced through the slot 2 passes either solely in the direction of arrow 7 if a wall 8 is present, or may pass additionally in the direction of arrow 9 if the wall 8 is omitted. The width of the opening 4 is indicated by dimension A and the width of slot 2 by dimension B in FIG. 1.

A further embodiment of basic apparatus in accordance with the invention is indicated diagrammatically in FIG. 2 in which the opposed wall 5 in the FIG. 1 embodiment is no longer present and the opening 4 forms a direct continuation of the slot 2. It has been found that with this construction the material layers itself as indicated diagrammatically in FIG. 3. Whereas in the FIG. 1 embodiment, the opposed wall 5 brought about a change in the direction of movement of the material and thereby effected layering, in the FIG. 2 embodiment it is believed that the back pressure created by the layered extrudate present in the opening 4 brings about the change in the direction of movement of the material and hence the layering thereof.

In FIG. 4 a modification is shown in that the slot 2 enters centrally into the opening 4.

The dimensions A and B may vary considerably dependent upon the starting material and the type of foodstuff to be simulated. It has been found however that the dimension B may vary between 5 and 20 thousandths of an inch and the dimension A may vary between 10 to 250 thousandths of an inch, but preferably the dimension A lies within the range 80 to 120 thousandths of an inch.

The opposed walls 5 and 6 which define the opening 4 within which the extrudate is folded or layered may converge or diverge in the direction of arrows 7 and 9 in FIG. 1 or the direction of arrow 7 in FIG. 2.

The starting materials used have been defatted soya flour, grit or flake (meal) (approximately 50% protein), mixtures of vital wheat gluten/soya flour (0 to 30% gluten) and fish protein concentrate/soya flour. Other materials may be suitable including soya concentrate and isolate, tic bean concentrate or flour, mixtures having higher levels of gluten and other animal proteins, comminuted dried meats, wheat starch and other cereal products and also other oil seed proteins. Starting materials may be vegetable or animal or fish protein or single or multi-cell protein or combinations of these materials.

Referring now to FIG. 7, the dried proteinaceous feed material containing from 30 to 95% protein is fed into a feed hopper 10 having a mixing device 10a and into a steam preconditioner 10b having a screw feed. From the preconditioner the material is fed into a first section of a helical conveyor 11 which may be a Wenger extruder. Water is injected at 11a and the conveyor is rotated by an electric motor 11b. The water is metered in by a small variable feed pump or by other accurately variable means.

At the downstream end of the helical conveyor is a die 12 which may have a knife 12a associated therewith for severing lengths of extruded material.

The feed water may contain additives of, for example, sodium hydroxide up to a concentration of 1.6 grammes per liter (N/25). Under normal operating conditions depending on the composition and ambient moisture content of the dry feed material, the moisture of the wetted feed may be from 20 to 40% moisture as is basis. The additives may include colourings, flavourings, spices and the like to enhance the acceptability of the product. These may be added prior to or after extrusion.

Different types of helical conveyor may be employed although a Wenger machine has been found particularly useful. The machine must be capable of compressing and heating the coagulable proteinaceous material within a chamber. In the Wenger machine already used, which consisted of eight barrels, the first four were cooled while the last four i.e., those nearer the die at the downstream end of the conveyor were steam heated with steam at 70 to 80 psig. The helical conveyor of the Wenger X5 may be rotated at any speed between approximately 100 to 900 r.p.m. and the optimum fibrous product is achieved at approximately 600 to 800 r.p.m.

The Wenger machine thoroughly mixes, compresses and then heat coagulates into a plastic condition the proteinaceous feed material and, during this time, the material is aligned by the rotation of the helical conveyor to give a fibrous material which is then fed into the die 12.

One particular form of die in accordance with the invention is illustrated in FIG. 8 in which the helical conveyor 13 rotates within a cylindrical housing 14. At the downstream end of the helical conveyor is an end plate 15 having a circular aperture 16. A plug, generally indicated at 17, has a cylindrical part 18 which projects slightly into the aperture 17 and a further part 19 which has a face 20 which is disposed parallel with a face 21 of the end plate 15.

The dimensions A and B referred to in describing FIGS. 1 and 2 are also indicated on FIG. 8. The dimension B is the annular slot defined by the plug 18 and the aperture wall 16 and the dimension A is the opening which lies between the faces 20 and 21.

The pressure drop across the die is likely to be in the order of 100 to 500 p.s.i.g. and the temperature of the die and the downstream end of the helical conveyor, about 100° to 180° C.

A modified construction of die is illustrated in FIG. 9 in which like parts to the embodiment of FIG. 8 have been given like reference characters. The only difference is that the cylindrical part 18 of the plug 17 projects into an annular recess 22 in the end plate 15 so as to define a stepped opening for the extrudate. The important dimensions nevertheless are the dimensions B and A as in the FIG. 8 embodiment.

During use of the apparatus in accordance with the invention as described in relation to FIGS. 7, 8 and 9, it will be appreciated that rotation of the helical conveyor 13 compresses the amorphous mass at the same time as the heating means in the form of the heated barrels of the Wenger raises the temperature of the mass to produce heat setting. A gross fibrous structure is imparted to the mass as it moves along its helical path towards the die. When the mass reaches a chamber 23, as indicated in FIGS. 8 and 9, a gross fibrous structure will have been imparted to the mass, the gross fibres lying generally circumferentially within the mass. As the pressure then extrudes the mass through the slot into the opening and because the dimension A of the opening is greater than the dimension B of the slot, a slight expansion of the extrudate is allowed with substantially no puffing. In the opening 4, into which the extrudate emerges, the mass is layered to produce a structure very generally indicated diagrammatically in FIG. 5. This layering is in the nature of folding the material within the opening 4. It will be seen from FIG. 5 that the layers generally have an arcuate shape although this may not always occur and may not readily be apparent from an inspection of the extrudate. Also, the gross fibrous nature of the extrudate has the fibres disposed to conform generally to that same arcuate shape. The individual fibres are indicated very diagrammatically at 24 in FIG. 5.

Figure 5:
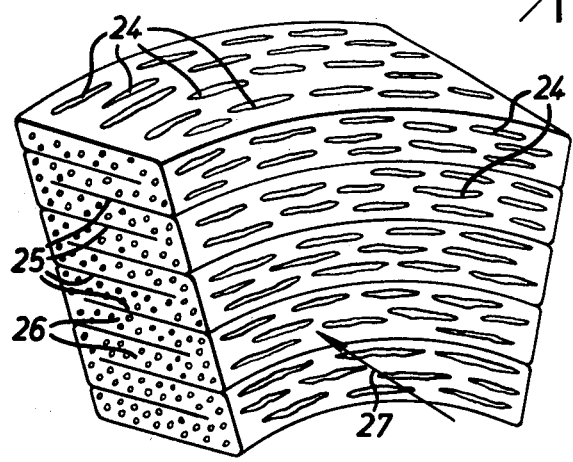
FIGS. 5 and 6 are diagrammatic perspective views showing extrudate after it has been layered in accordance with the methods of the invention.
Figure 6:
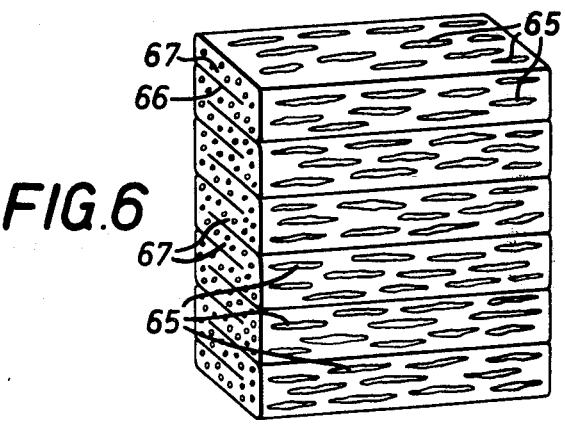

Although theoretically the extrudate has a generally arcuate layered shape as indicated in FIG. 5, the shapes extruded will be irregular. However, they will be flat to a thickness substantially equal to the size of opening A and the gross fibres will lie generally parallel with the boundaries 25 between adjacent layers 26 and also generally parallel with the main faces of the extrudate i.e. the face and its equivalent seen in the direction of arrow 27 indicated in FIG. 5.

The product extruded by the method of the invention is extremely fibrous and tough and is partially heat set when it emerges from the opening 4.

The extrudate may then be dried in any suitable drying apparatus 28 (see FIG. 7). The dried product may then be reconstituted in boiling water for from 15 to 30 minutes and the reconstituted protein material has a gross structure which is extremely like sliced meat. On close inspection the material is also found to resemble meat in that discrete fibrous threads may be pulled away from the slice. On chewing the material, it is found to be firm and chewy without being too rubbery. The fibrous quality makes it feel quite like meat in the mouth.

The product may be boiled in a sauce for two hours or more or canned in a sauce for 90 minutes at 250° F. without any apparent deterioration in texture. The slices of material may also be minced in a standard mincer to give a very realistic mince beef which may be dehydrated.

It is believed that the helical conveyor compresses and heats the starting material to a plastic mass which is coagulated by the heat and a fibrous structure imparted by the helical conveyor, these fibres being arranged circumferentially within the mass. This heat set and plastic mass is then ejected after the last barrel of the Wenger machine tangentially and travels through the die through an annular slot and then radially outwardly maintaining a low pressure drop preferably in the order of 200 p.s.i.g. or less. The material is allowed to expand slightly and fold or distort itself as it flows into the opening A. The folding or layering which occurs in the opening is fixed or heat set by thermal transfer from the end plate which may be stainless steel.

In a modification of the apparatus just described, the die components may be mounted in such a way that gaps of variable dimensions are presented to the material being extruded. For example, a component may be mounted to have limited play so that it will assume an attitude dependent on the pressure of the extrudate. As this pressure fluctuates so the attitude of the component may alter.

Such a component or more than one such component may be mechanically oscillated by external means such as an electric motor.

Figure 12:
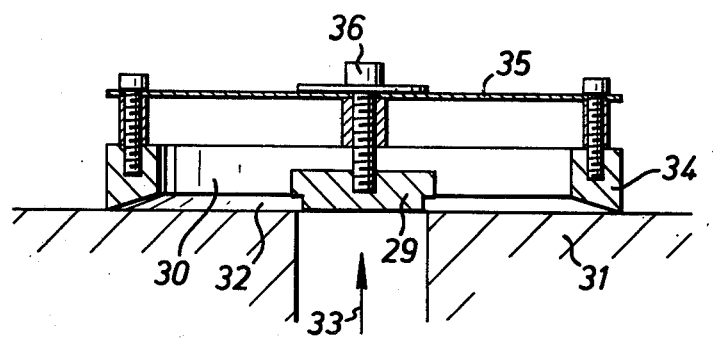
FIG. 12 is a cross-sectional side elevation through a modification of the apparatus of FIG. 8.
Figure 13:
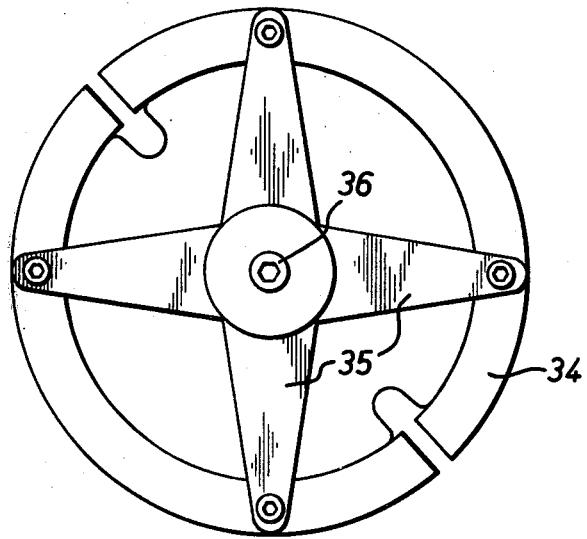
FIG. 13 is an end view of the apparatus of FIG. 12.

One such additional component is illustrated, by way of example in FIGS. 12 and 13 in which it will be seen that a plug 29 inserted into a die plate 30 defines, with back plate 31, a radial opening 32, the material being forced in the direction of arrow 33. A trembler ring 34 is free to oscillate under the influence of leaf springs 35 held at their centre by screw 36.

The effect of this trembler ring will be to restrain the emergence of the extrudate from the gap between the ring and the extruder end plate 31 and thereby create a back pressure which will build up during the folding and layering of the extrudate in the outlet 32. When this pressure builds up to such an extent that it overcomes the restraining influence of springs 35, the extrudate will emerge. Adjustment of the spring pressure will control the amount of tightness of the folds in the extrudate. The trembler ring may be constructed in such a way that it comprises two or more parts together forming a multi-sectional ring.

In the previously described embodiments, the extrudate emerged from the apparatus in a radial direction and only one die was provided. So as to increase the productive capacity of a radial extrusion die, the embodiments of FIGS. 10 and 11 have been designed.

Figure 10:
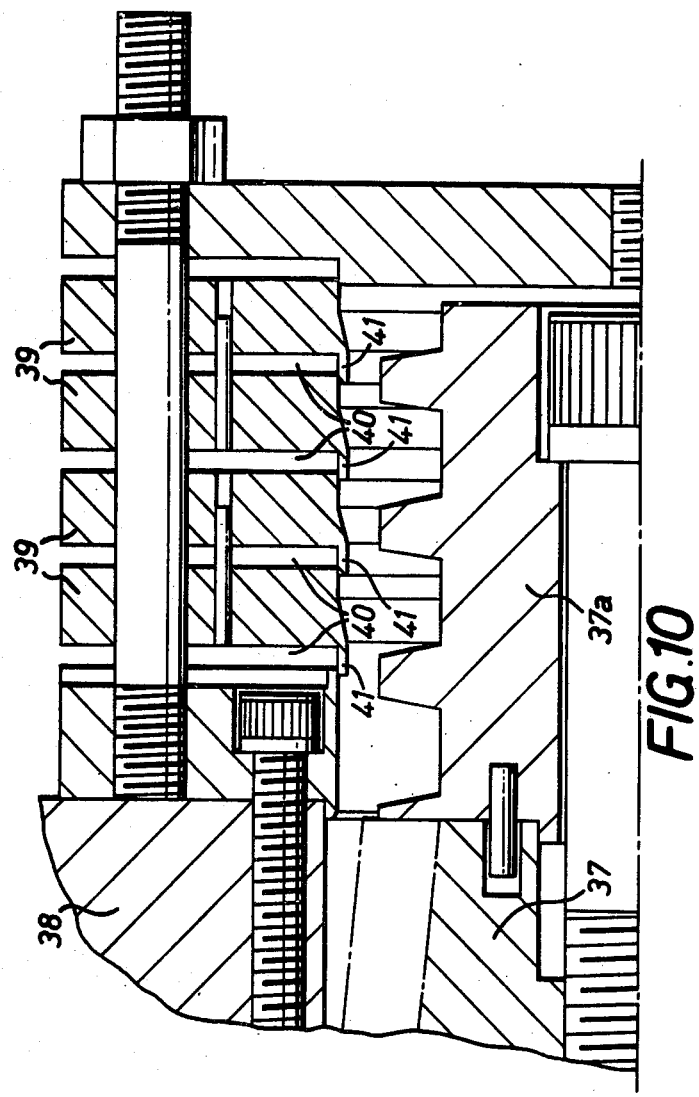
FIG. 10 is a cross-sectional view through part of a further die in accordance with another embodiment of the invention.

Referring first to FIG. 10, it will be seen that there is provided a helical conveyor 37 within a housing 38. The helical conveyor 37 may be extended by a member 37a which may be smooth or (as shown) provided with helical flights. A plurality of spaced discs 39, are provided, the gaps 40 between the discs defining separate outlets for the extrudate and the discs being shaped at their inner peripheries with flanges 41 which define, with adjacent discs 39, the slots through which the mass is extruded.

Figure 11:
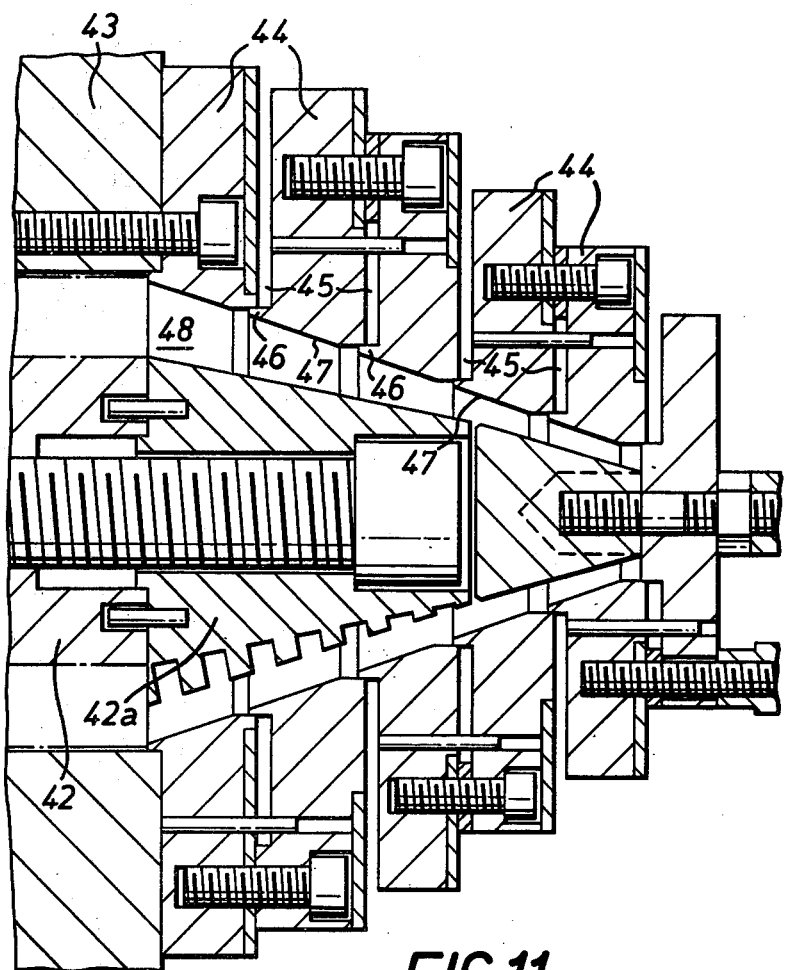
FIG. 11 is a cross-sectional view through a further die in accordance with yet another embodiment of the invention.

In the embodiment of FIG. 11 the downstream end of the helical conveyor 42 may be provided with an extension member 42a which may be smooth or helical and tapered. The housing 43 is provided with plates 44 which are tapered and, as in the previous embodiment, define with their neighbours, openings 45 through which the extrudate emerges. The inner peripheries of the plates 44 are provided with flanges 46 so as to define the slots through which the mass is extruded. The inner peripheries 47 of the plates 44 form an extension of the housing 43 and, together with the outer surface of the tapered end portion of helical conveyor 42a, define a gap 48 which may narrow at the downstream end of the die. This narrowing of the gap may ensure that the pressure forcing the mass through the slots into the openings 45 is of the same order in all cases.

Whereas in all the previous embodiments above described the constructions contemplated what may be termed radial extrusion of the mass i.e., the opening is disposed in a plane which passes through the rectilinear axis of the helical conveyor, it is included within the scope of the present invention to extrude in other directions which may be termed axial and longitudinal. It may be stated that the opening through which the extrudate emerges in the radial and longitudinal embodiments of the invention are disposed in a plane through the rectilinear axis of the helical conveyor whereas in the axial embodiment the extrudate emerges into an opening disposed in a plane which is parallel with a plane within which lies the rectilinear axis of the helical conveyor. It will be noted that these three directions, namely radial, axial and longitudinal, are intended to refer to three planes which are mutually at right angles to each other. However, the invention is not limited to the movement of the extrudate through these planes but the extrudate may move in a plane which lies at any angle found desirable to the rectilinear axis of the helical conveyor. In all cases, however, the basic principals enunciated in connection with FIGS. 1 and 2 will be adhered to although various angles may be changed, for example, in referring to FIG. 1, the wall 8 may not be at right angles to the wall 5 nor need the wall 8 be a straight continuation of the exit of slot 2.

Figure 15:
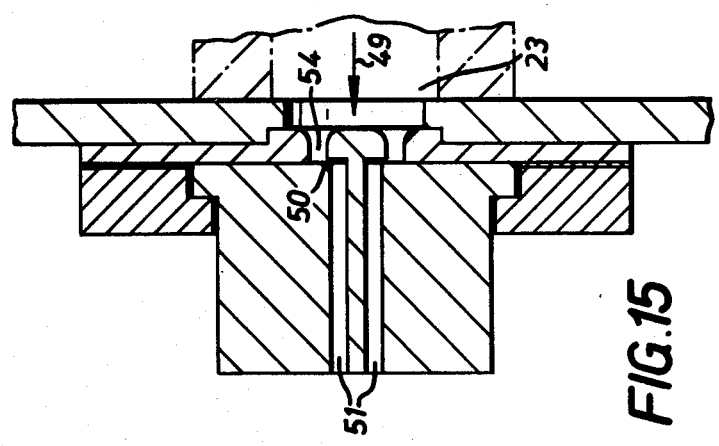
FIG. 15 is a cross-sectional view on the line XV—XV of FIG. 14.
Figure 14:
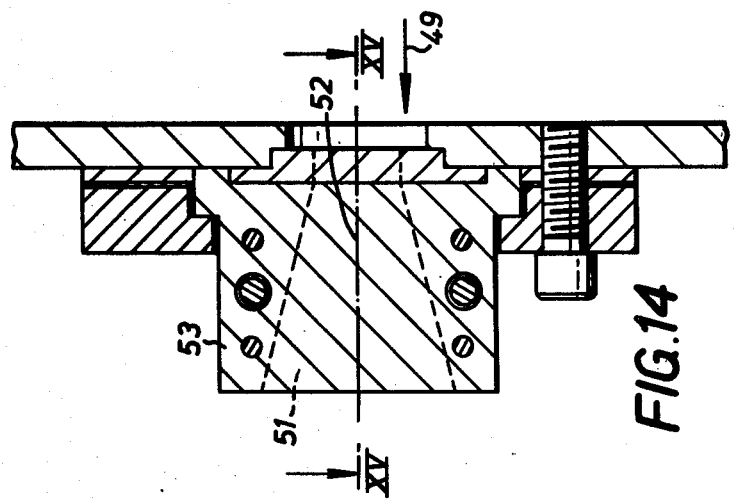
FIG. 14 is a cross-sectional elevation through a further die constructed in accordance with the invention.
Figure 16:
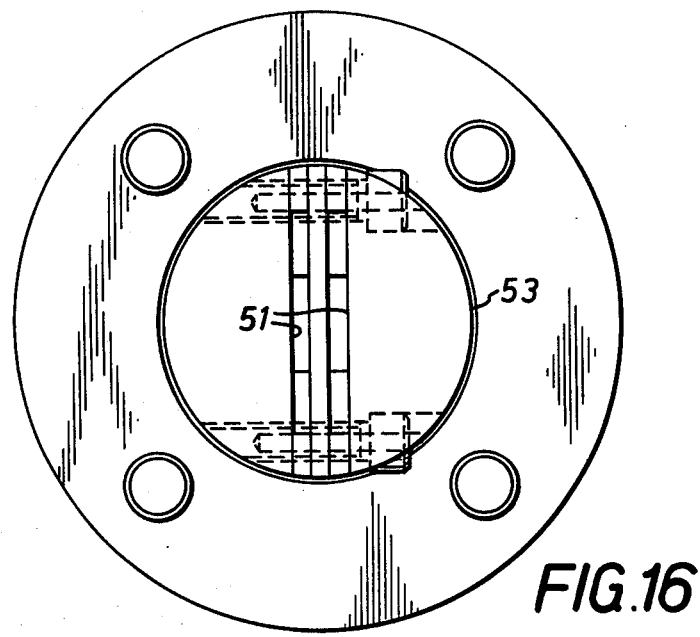
FIG. 16 is an end view of the apparatus of FIG. 14.

Referring now to FIGS. 14, 15 and 16, it will be seen that in this embodiment, where only the die is illustrated, the material fed from the helical conveyor in the direction of arrow 49 is extruded through rectilinear slots 50 and emerges into openings 51 disposed in a plane parallel with the plane within which lies the rectilinear axis of the helical conveyor, such axis being indicated at 52. It will be noticed that in this embodiment two openings 51 are provided one on each side of the said axis 52. The die includes a block 53 with tapered slots 51. The slots 50 are supplied through openings 54 from chamber 23.

Figure 17:
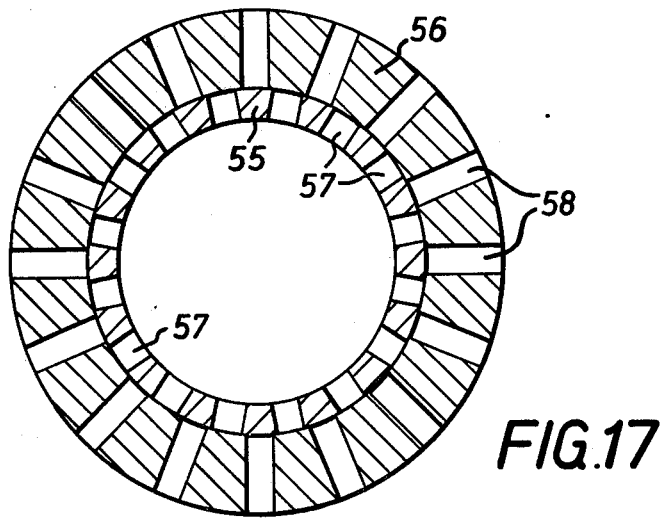
FIG. 17 is a lateral cross-sectional view through a further apparatus constructed in accordance with the invention.
Figure 18:
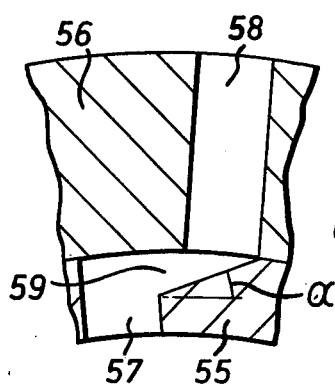
FIG. 18 is a cross-sectional view of part of the apparatus of FIG. 17.
Figure 19:
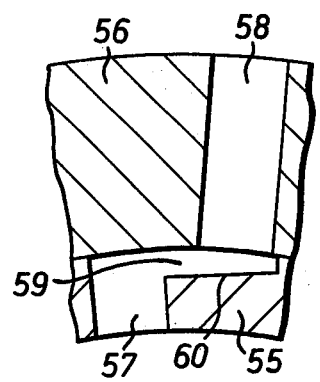
FIG. 19 is a cross-sectional view of part of a modification of the apparatus of FIG. 18.

Referring now to FIG. 17 which very briefly indicates a construction for longitudinal extrusion it will be seen that two concentric cylinders 55 and 56 are provided, the cylinder 55 being located co-axial with and within the cylinder 56. The cylinder 55 is provided with inlet slots 57 and the cylinder 56 is provided with openings 58. The openings 58 form the outlets and may be parallel sided or may be converging or diverging as desired. Either the inner cylinder 55 or the outer cylinder 56 will be machined so as to provide the appropriate dimensions of slots leading from the bore of cylinder 55 to the openings 58 conforming to the principle of the invention as enunciated in connection with FIG. 1. Such an arrangement is illustrated in FIG. 18 where the slot through which the mass is extruded is indicated at 59. An alternative arrangement is illustrated in FIG. 19 and differs only from that of FIG. 18 in that the wall 60 forms a continuation of the slot 59 whereas the equivalent wall in the embodiment of FIG. 18 is at an angle which may be in the order of 15°.

Figure 20:
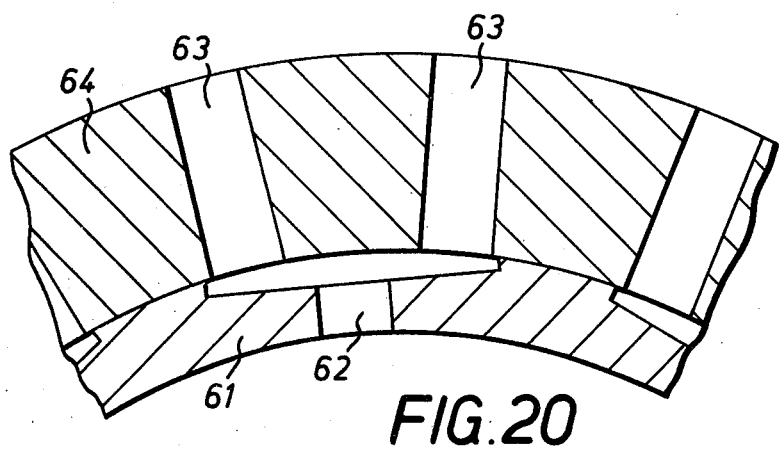
FIG. 20 is a cross-sectional view of part of yet a further modification of the apparatus in FIG. 18.

In an alternative arrangement illustrated in FIG. 20 an inner cylinder 61 is provided with inlets 62 which communicate each with two openings 63 in an outer cylinder 64.

Axial extrusion which is that contemplated with reference to FIGS. 14, 15 and 16 produces an extrudate as illustrated in FIG. 5 in which the gross fibres 65 lie parallel with the main faces of the extrudate and parallel with the boundary layers 66 between adjacent layers 67. This basic type of extrudate differs only from that produced by radial extrusion in that it has a rectangular overall shape whereas with radial extrusion the tendency is for the basic shape to be arcuate as indicated in FIG. 4.

With longitudinal extrusion which is that contemplated with reference to FIGS. 17, 18, 19 and 20, an extrudate is produced which is in accordance with FIG. 5.

Figure 21:
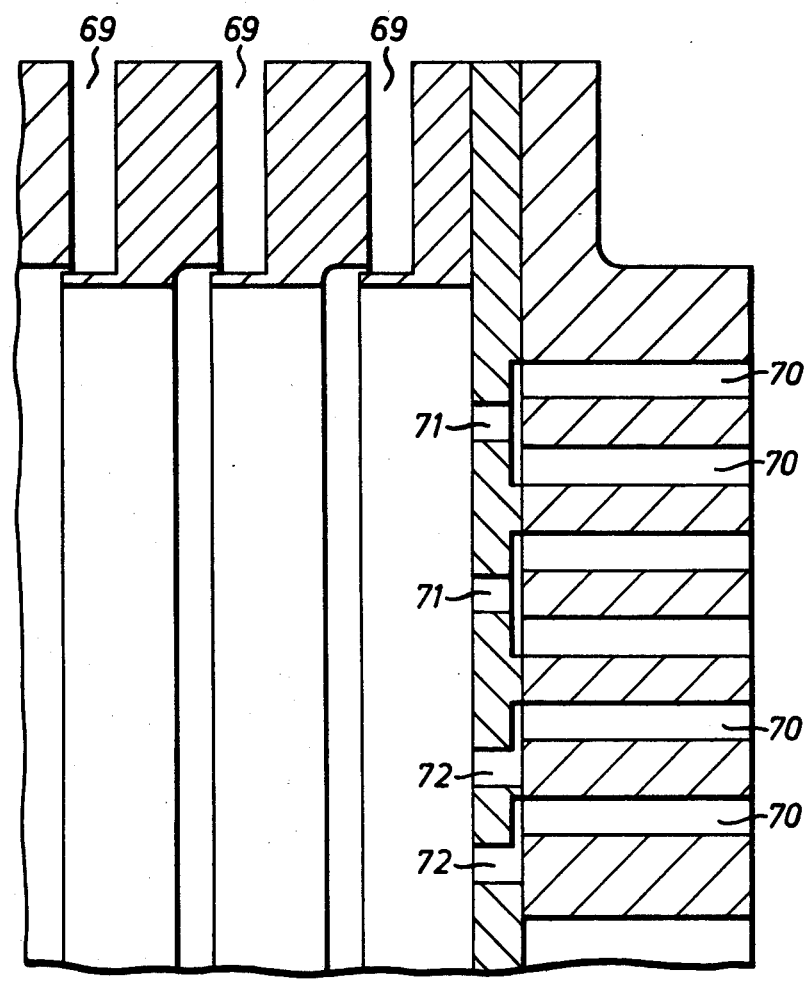
FIG. 21 is a longitudinal sectional view through a composite die assembly in accordance with the invention.

In a single piece of apparatus it is conceivable that radial and axial and possibly longitudinal extrusion may be carried out and an embodiment employing both radial extrusion and axial extrusion is indicated in FIG. 21. In this Figure it will be seen that radial outlets 69 and axial outlets 70 are provided. A variation of the axial outlet arrangement is indicated in that inlets 71 are common to two outlets whereas inlets 72 lead to single outlets.

We claim:

1. Apparatus for forming a proteinaceous mass into a fibrous and layered structure, comprising a housing defining an axially elongated bore, a helical conveyor rotatable in said bore for feeding the mass toward a downstream end of said housing, die structure at the downstream end of said housing and including an axially elongated annular member communicating with said housing bore and defining radially outwardly open slots the inner ends of which slots communicate with the interior of said annular member said die structure further including an outer member having an internal elongated cylindrical surface mating with said annular member's external surface, said mating surfaces having means cooperating to define restrictive extrusion passageways which are oriented generally circumaxially and which passageways communicate with the outer ends of said radially outwardly open slots, said outer member defining openings communicating with said extrusion passageways and having cross sectional areas related to the areas of said passageways such that the proteinaceous mass is extruded from each of said passageways in a ribbon, which ribbon is folded upon itself in each of said openings, said openings being oriented radially and perpendicular said circumaxially extending mating surfaces.

2. Apparatus according to claim 1 wherein the ratio of thickness for said passageways in the radial direction, to the width of said openings in a direction perpendicular thereto, lies in the range between 5/10 and 20/250.

3. Apparatus according to claim 1 wherein the ratio of thickness for said passageways in the radial direction, to the width of said openings in a direction perpendicular thereto, lies in the range between 5/80 and 20/120.

4. Apparatus for forming a proteinaceous mass into a fibrous and layered structure, comprising a housing defining an axially elongated bore, a helical conveyor rotatable in said bore for feeding the mass toward a downstream end of said housing, die structure at the downstream end of said housing and including a first portion defining at least one slot oriented parallel to the axis of said housing bore and having an inner end communicating with said housing bore, said die structure further including a second portion having a planar surface which mates with the adjacent surface of said first die portion, said mating surfaces having means cooperating to define a restrictive extrusion passageway oriented in the plane of said mating surfaces and which passageway communicates with the outer end of said slots, said second die portion defining at least one opening oriented substantially parallel to said axis and communicating with said extrusion passageway and having a cross sectional area related to the area of said passageway such that the proteinaceous mass is extruded from said passageway in a ribbon, which ribbon is folded back upon itself in said opening, said opening being oriented generally perpendicular to the plane of said mating surfaces.

5. Apparatus according to claim 4 wherein the ratio of thickness for said passageway in the axial direction, to the width of said opening in a direction perpendicular thereto, lies in the range between 5/10 and 20/250.

6. Apparatus according to claim 4 wherein the ratio of thickness for said passageway in the axial direction, to the width of said opening in a direction perpendicular thereto, lies in the range between 5/80 and 20/120.

* * * * *